United States Patent [19]
Jensen

[11] Patent Number: 5,160,215
[45] Date of Patent: Nov. 3, 1992

[54] GROUND SURFACING AND EROSION CONTROL DEVICE

[76] Inventor: John S. Jensen, 4651 Mill Pond Rd., Myrtle Beach, S.C. 29577

[21] Appl. No.: 678,209

[22] Filed: Apr. 1, 1991

[51] Int. Cl.$^5$ .............................. E02B 3/14; E01C 5/14
[52] U.S. Cl. .......................................... 404/46; 52/611; 404/35; 405/16
[58] Field of Search .................. 404/34, 35, 36, 40, 404/41, 42, 44, 45, 46, 16, 17; 52/574, 611, 604

[56] References Cited

U.S. PATENT DOCUMENTS

| | | | |
|---|---|---|---|
| 1,412,504 | 4/1922 | Byrne | 404/45 X |
| 3,252,287 | 5/1966 | Suzuki | 404/41 X |
| 3,344,609 | 10/1967 | Greiser | 405/17 |
| 4,372,705 | 2/1983 | Atkinson | 404/40 X |
| 4,436,447 | 3/1984 | Crowe | 405/16 |
| 4,572,705 | 2/1986 | Vignon et al. | 405/16 |
| 4,629,358 | 12/1986 | Springston et al. | 404/44 X |
| 4,664,552 | 5/1987 | Schaaf | 404/40 |
| 4,694,629 | 9/1987 | Azimi | 52/611 |

FOREIGN PATENT DOCUMENTS

| | | | |
|---|---|---|---|
| 2011246 | 9/1970 | Fed. Rep. of Germany | 404/46 |
| 518239 | 5/1921 | France | 52/611 |

*Primary Examiner*—William P. Neuder

[57] ABSTRACT

A surface device with erosion control features consisting of uniform T-shaped elements made of various materials (wood, metals, plastics, composites, fiberglass, reinforced concrete etc.) that are secured in a relative position to each other forming a coffer dam erosion containment and loadbearing surface. The securing methods of stapling the T-shaped elements to wire mesh or fabric backing (wood elements) or using connecting cabling, wire, rope, chains, rods, ties, pins, etc. with the (metal, plastic, fiberglass and concrete T-shaped elements) in addition to reinforcing and containment provides a means of prefabbing mats or modules of desired sizes for handling, storage, transportation and application. These mats can be used in highway construction for: stabilizing soils under roadbeds, as highway shoulders, ditch linings and erosion control of embankments. The invention can be used to construct secondary roads, logging roads, nature trails, bike and golf cart paths. These mats have military and emergency disaster uses to build temporary roads, landing strips, parking ramps, repair bomb damaged surfaces or for any use requiring a stable surface. The device of larger and heavier sizes (concrete versions) can be used to build up and restore beach and dune areas lost by erosion from natural phenomena and provide protection to coastal structures, buildings, breakwaters, sea walls, channels, etc. from erosion caused by tides, wave actions, and the forces of storms and hurricanes.

16 Claims, 12 Drawing Sheets

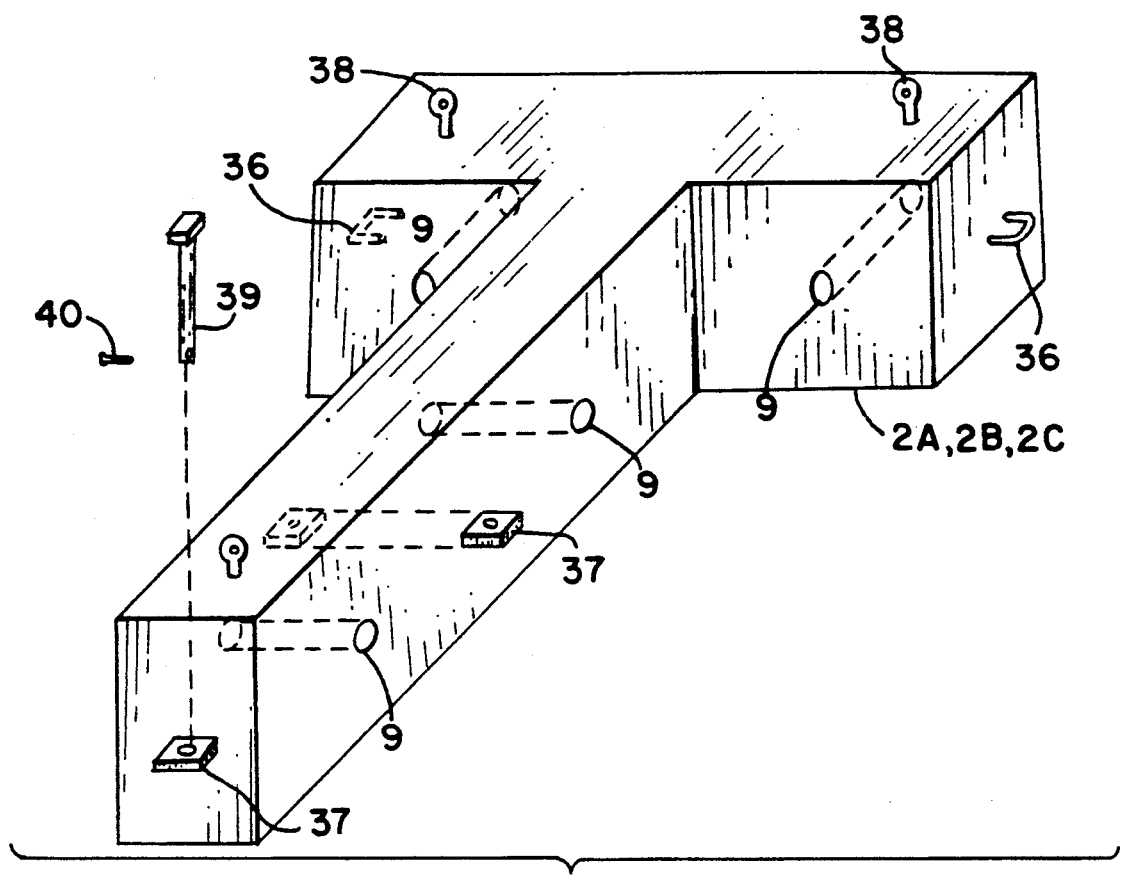
FIG. 18
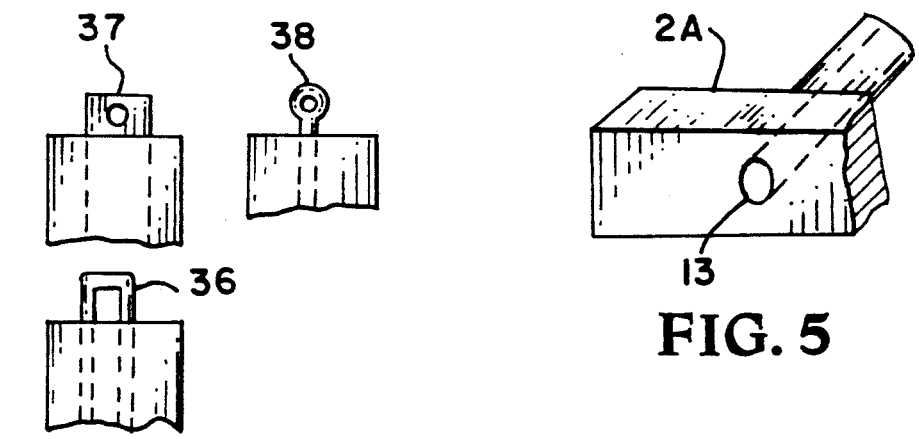
FIG. 19
FIG. 5
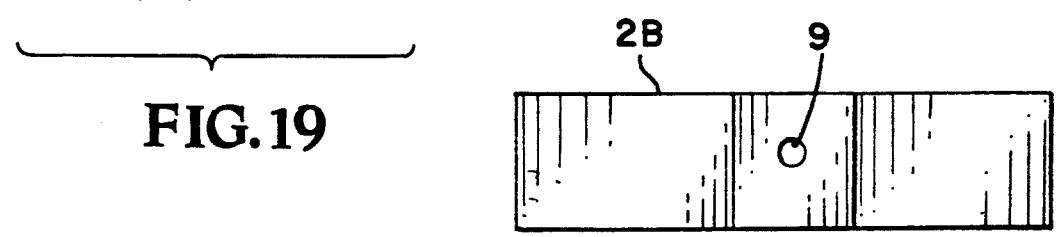
FIG. 8

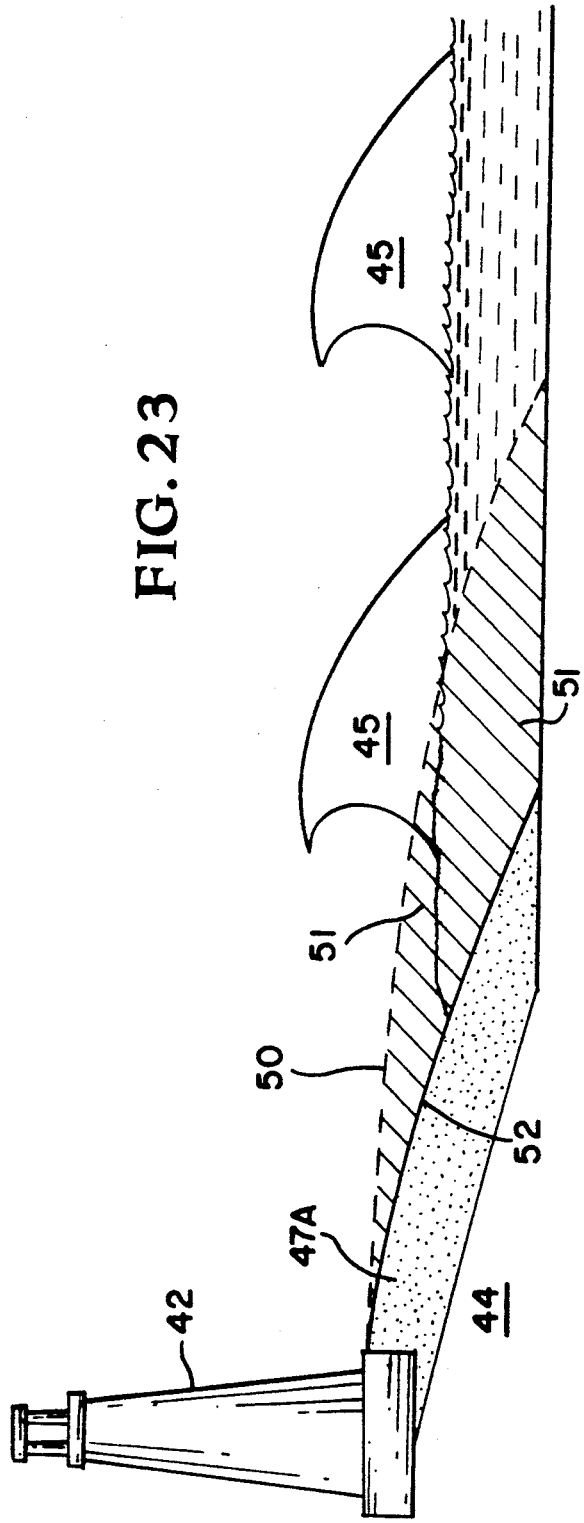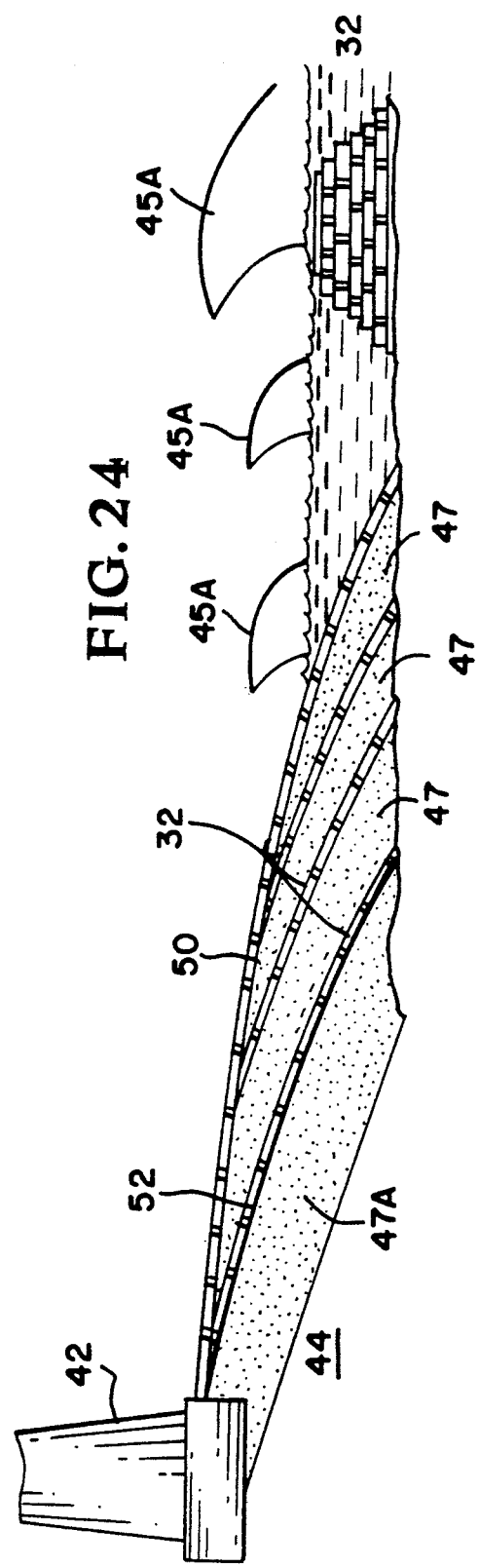

GROUND SURFACING AND EROSION CONTROL DEVICE

TECHNICAL FIELD

The present invention relates to a device to provide a stable load bearing surface in sand, wetlands, dunes, etc to stablize the surface thereof permitting vehicle, pedestrian, and pack animal travel where there are no existing roads, trails, or paths and for any other uses requiring a stabilized surface such as aircraft runways, parking ramps, taxiways, storage and supply/ ammo dumps etc. to be utilized during a military situation or in emergency conditions of natural disasters to restore roads, rebuild and stabilize washed out areas etc. Further the present invention by it's inherent design and application forms hollow coffer dams surrounded by rigid wall portions that capture and stabilize loose materials thereby controlling erosion in a vast number of situations and can be used in conjunction with known road construction practices.

BACKGROUND ART

It is known that it is very difficult for wheeled vehicles even four wheel drive vehicles and pedestrians to move in very loose sand or wet boggy areas. The reason is well understood. Where there is a surface condition such that the surface material lacks cohesion and cannot be compacted the surface is displaced whenever a weight or forces are introduced on that surface such as vehicle wheels that spin and slip displacing material preventing or hindering vehicle movement. It is also known that loose sand as on a seashore beach where the tidal changes saturate the sand the surface can withstand traffic. The wetness of the sand provides cohesion and most important compaction preventing displacement. In boggy areas or super saturated soils other means are required to prevent displacement (sinking) usually by introducing a fill material. This invention relates to a means of compacting and treating the surface areas of loose sand and soils where there is a relative high density of movement by vehicles or persons. Where those areas cannot be paved by standard methods because of time constraints or nonavailability or the standard paving materials bitumen, concrete, gravel, etc. the roads rut and become impassable. Trails and paths deteriorate, grassy areas and vegetation are destroyed. It is well known to use manufactured devices for erosion control. It is also known to use manufactured devices for surfacing materials. When a device designed for erosion control and is similarily designed to be used as a devise for a surface substitute for paved surface areas and visa versa then the device becomes doubly valuable.

The use of manufactured devices for erosion control such as revetments along river banks, ditches, and shorelines often with added or imported materials, rocks, gravel, fiberous plant growth, etc. to stabilize the base of supersaturated soils or unstable and loose sandy areas is well known. In addition the planting of vegetation for highway shoulders and embankments to provide a more permanent and certainly more natural and attractive stabilizing means is well known.

It is known that modern highway construction requires certain basic principles. One is that a solid non erosive base foundation be layed, stabilized and compacted before the final road surfacing layer of concrete or asphalt mix is applied. Another principle is that compacted stable shoulders are constructed along with the roadbed to prevent deterioration of the roadway edges from erosion beneath the edge surface causing failures and pot-holing. Also having stable non eroding shoulders for traffic safety is well understood.

In recent years there has been a great concern about beach erosion along the Atlantic coast of the United States. Federal, State, County, and City agencies are spending millions of dollars to refurbish the eroding beaches because their economy and commerce is greatly affected with the loss of income from recreational and tourist spending because of beach erosion. New laws have been introduced for beachfront and shoreline management. Engineers are trying to conceive ways of saving coastal structures of historic and economic value such as lighthouses, piers, hotels, beach homes, commercial buildings, and shoreline highways from shoreline erosion.

The natural phenomenon of the ever changing features of the barrier islands along the Atlantic Coast; shorelines disappearing and rebuilding with the tidal and wind action often exposing shipwreck remains that do not shift or move year after year indicates that there can be devices designed to stop or greatly hinder beach losses to erosion or in some way work with nature in restoring beach front property. In addition, over the last decade a series of severe hurricanes and storms on the Atlantic coast has revealed that existing methods to control erosion has not proved satisfactory. Recent studies indicate that seawalls as previously constructed in some instances actually have caused greater harm and have introduced more losses than the areas protected.

In addition to the devices mentioned hereinabove, particular devices which are known by the present inventor include devices such as those disclosed in U.S. Pat. No. 132,801 granted to Chinnock, Nov. 5, 1872 which illustrates a paving structure including a wooden frame structure into which cement is poured and cured resulting in an alternating concrete and wooden foot surface.

U.S. Pat. No. 649,323 granted to Litz, May 8, 1900, discloses a method of forming a stable wood mosaic by interweaving wires between notches in individual wooden flooring cubes.

U.S. Pat. No. 746,094 granted Dec. 8, 1903 to Judson, Discloses a floor or similar surface wherein the individual blocks are secured in a spaced side-by-side position by rigid rods which are smaller than the bores containing them such that the individual blocks are movable relative to each other.

U.S. Pat. No. 1,066,092 granted to Ellery Jul. 1, 1913 discloses a flexible mattress used as a revetment, fabricated of cable and rolls of brush held in place by weights and anchors, it is expected that the brush will root itself.

U.S. Pat. No. 2,454,292 granted to Pickett on Nov. 23, 1948 discloses a revetment mat comprising reinforced concrete slabs secured together by wire or cable permitting the device to be rolled up and transported to the particular location requiring the control.

U.S. Pat. No. 3,876,628 granted to Dixon, Jr. Mar. 10, 1959 discloses a revetment mat which has pocket areas to capture the loose surrounding soil, increasing stability and is fabricated such that it permits limited flexibility.

U.S. Pat. No. 4,152,875 granted to Soland, May 8, 1979 discloses a ground covering fabricated of adjoining plates secured together by intersecting cables of rods allowing limited flexibility.

U.S. Pat. No. 4,644,552 granted to Schaff, May 12, 1987 discloses an erosion control revetment fabricated of preformed blocks secured to cables or the like by interlocking sleeves permitting flexibility in one direction.

With the above noted prior art in mind it is an object of present invention to provide a device or devices for stabilizing a surface for load bearing traffic where the device is fabricated of scrap waste material of wood of the timber manufacturing industries (wood truss plants, housing developments, lumber mills etc.) thereby making the product inexpensive and of simple construction permitting unskilled labor and some automation. Further, by prefabricating the devices and stockpiling the devices as seperate elements or preassembling the elements with accompaning materials into storable and functional use sizes ready for easy transportation and application is highly desirable. The wood used for the devices or elements used should be decay resistant naturally by the species (redwood, cedar, etc.) or by treatment using by well established wood preserving processes i.e. Osmose K-33 etc.

It is another object of the present invention to provide a device for surface stabilization and erosion control using known manufacturing processes to cast, extrude, weld, form, or mold the device/elements of metals, plastics, fiberglass composites raw or recycled materials thereby affecting economy by mass production. As in the wooden versions above preassembly, stockpiling, and easy transportation and application is accomplished.

It is another object of the present invention to provide a device for surface stabilization and erosion control manufactured of precast reinforced concrete T-shaped elements (larger and heavier) that is manufactured, stockpiled and readied for easy transportation and application.

It is another object of the invention to use a broad range of sizes for the T-shaped elements of the devices depending on the functional uses thereof i.e. The device or devices can be applied with or without various supporting or connecting materials depending on the application. The T-shaped device/element sizes can vary from six to twelve inches in length and width (wood and formed plastic, cast, extruded metalic elements) used in a mat like surfacing for roads, highway shoulders, paths, nature trails, ramps, runway construction/military bomb damage repairs, parking areas, etc. to larger concrete T-shaped elements of four to ten feet in width and length, one to two feet in depth weighing hundreds/thousands of pounds each device/element. These concrete elements would be applied for shoreline and other marine uses for erosion control and the rebuilding of lost beach areas, the construction of jetties, breakwaters, seawalls, canals, fishing reefs, etc.

It is another object of the invention to use many methods of manufacturing the invention; such as using unskilled, handicapped, institutional personnel, prison inmates etc. to fabricate and assemble the simple wood version of the invention for the needs of State, County, and City highway departments to using the mass production methods of casting, extruding, welding, forming, and assembly in plants of the industries now manufacturing other products with materials herebefore mentioned. The normal commerce of marketing, selling, stockpiling, storing and shipment of the invention modules as called for by user agencies, military and civilian would apply.

SUMMARY OF THE INVENTION

In all aspects of the present invention are unique T-shaped elements. Each T-shaped element by its' inherent shape provides two bottom planes of surfaces one perpendicular or longitudinal to the other that equally bear on a flat planular surface. This characteristic provides a non tilting feature and a horizontal stability in two directions not inherent in elements that are linear or bar shaped. Further, when one T-shaped element is placed adjacent to another T-shaped element normally with the T portion perpendicular to the I portion of the other element at midpoint a coffer dam is formed that is square or in some designs rectangular in shape and having four vertical walls. With the addition of placing a plurality of elements adjacent to each other a plurality of coffer dams are introduced. The stability of the single element mentioned herein above is increased by the stability of the adjacent elements multifold. With the additional feature of adding fill materials into the voids of the coffer dams more than likely with the soils or sands of the surface the invention is applied on compaction is introduced for the uses stated herein. Note the placement of the elements alone without any retaining devices (fabric, mesh, cables, rods, chains, etc.) even without the addition of fill materials provides a superior stable surface that resists shifting but is flexible to follow the contours of the surface that it is applied to. Another embodiment of the T-shaped elements is that the total surface areas of the elements can be a very small area in proportion to the total area of the surface that the invention is applied upon. Likewise the total volume/weight of the T-shaped elements can be a small proportion to the total surface volume/ weight of the surface volume acted upon. This feature allows an economy of materials in the manufacturing of the invention.

In one aspect of the invention wherein the primary purpose of the invention is for road and other surfacing requirements the addition of retaining devices onto or within the T-shaped elements is desired. The retaining devices provide a means to manufacture mats of appropriate sizes for ease of handling, transporting, storing, and application. The retaining materials provide additional stability to the already demonstrated stability features of the T-shaped elements/devices mentioned herein.

a. One aspect of the invention would be the use of wood for T-shaped elements mentioned herein. Noting that wood is a renewable source of material plus the fact that surplus wood is readily available makes this aspect viable for surfacing dirt roads, logging trails, nature trails, sandy areas, parking lots, highway shoulders, lining drainage ditches, erosion control, etc. where cost considerations are important. This aspect of the invention would also be used in asphalt bituminous road construction. The combination of using the invention for the sub base to stabilize the roadbed and adding a second layer of the invention with the asphalt pour would produce a roadway of great strength less subject to pot-holes and wear from execessive temperature changes. The primary retaining devices used with wooden elements could be wire mesh, standard fencing, and fabric. The type of fabric used would be a type well known and used in asphalt highway construction (PE- TROMAT). The use of (PETROMAT) allows great surface loading. These retaining materials would be attached to the wooden elements by stapling the wire mesh fencing or the fabric to the wood elements which are temporarily placed on flat jigs. This method of manufacture lends itself to hiring unskilled labor or the use of handicapped and institutionalized personnel. When applied the mats or modules would be laid on the surface to be used with the attaching materials bottom side down. The exposed grid/cofferdam areas would then be filled with the adjacent soils or sands or could be filled with other brought-in materials, gravel, rock or the asphalt mix or recently developed asphalt rubber mix composed of ground up worn out tires used in the construction of asphalt highways.

b. Another aspect of the invention for surfacing would use high strength, light weight metals, plastic, fiberglass, or composites for the T-shaped elements and use retaining materials such as cabling, wire, rope and other synthetic materials. The use of these materials lends itself to standard manufacturing practices and processes. The retaining materials would join the T-shaped elements to each other in the desired relativity to each other by the cables, wires, flexible rods, ropes, etc. passing through holes and passageways situated in the elements and terminating at the edges of the mats or modules by end stops composed of washers, pins, nuts, weldments, or other suitable fastners. The retaining materials would be so assembled onto or within the elements to provide attachment, stability, flexibility and tensioning in two directions running perpendicular to each other. Some models of T-shaped elements could have filler material of foam, concrete or plastic composites.

Further, by prefabricating the devices and stockpiling the devices as separate mats or modules with accompanying materials into storageable and functional use sizes ready for easy transportation and application economy and time saving is achieved.

Primary uses for this form of the invention would be military/government needs. This invention would be used to repair bomb damaged runways, ramps, build roads, parking and storage areas, and for other surfacing needs encountered during natural disasters such as floods, hurricanes, earthquakes etc. Another use of the light weight high strength version of the invention would be to have traction mats of suitable sizes designed to be carried on military vehicles and heavy construction vehicles that are subject to off road operations and can get stuck or entrapped in sand and wet soils.

c. Another aspect of the invention would use reinforced concrete for the T-shaped elements. Concrete weighs approximately 150 lbs./cu. ft. This characteristic introduces a desirable embodiment in that weight adds to a greater stability of the invention. The concrete T-shaped elements like the other elements mentioned herein would have a means of applying attaching materials and or including attachment devices built into the elements i.e. holes and passageways for cables, chains, rods, etc. These holes, and attachment devices also serve as lifting points to allow cranes to place the elements (weighing over 1000+ lbs./per element) in some applications. This version of the invention would be used for erosion control on beach and sand dunes subject to tidal, wind, and storm damage. This invention would be used to build sloped sea walls, breakwaters, jetties, ramps, quays, fishing reefs, line channels and other marine and shoreline uses.

One marine aspect of the invention would be to stratigically place engineered and appropriately designed modules of the invention off shorelines to trap and hold sand/seashells/kelp sea vegetation etc. to build new reefs that would extend or widen existing beaches. The tidal changes, wind actions, and underwater currents would be factors to consider in this application of the invention.

BRIEF DESCRIPTION OF THE DRAWINGS

FIG. 5 is a partial view of single wooden T-shaped element constructed by gluing and dowling two pieces of precut stock lumber.

FIG. 8 is an elevation view of FIG. 7.

FIG. 18 is a perspective view of a T-shaped element constructed of reinforced concrete.

FIG. 19 are three views of the attaching and lifting devices that are options in the construction of the T-shaped concrete elements.

FIG. 23 is a cross sectional view of the effects of beach and seashore erosion showing loss of beach areas and the eventual destruction of structures if beach erosion is not stopped.

FIG. 24 is the same cross sectional view of FIG. 23 showing how the present invention in one embodiment prevents further erosion and in other embodiments restores lost beach areas and even builds new beach areas.

DETAILED DESCRIPTION

Figure 1:
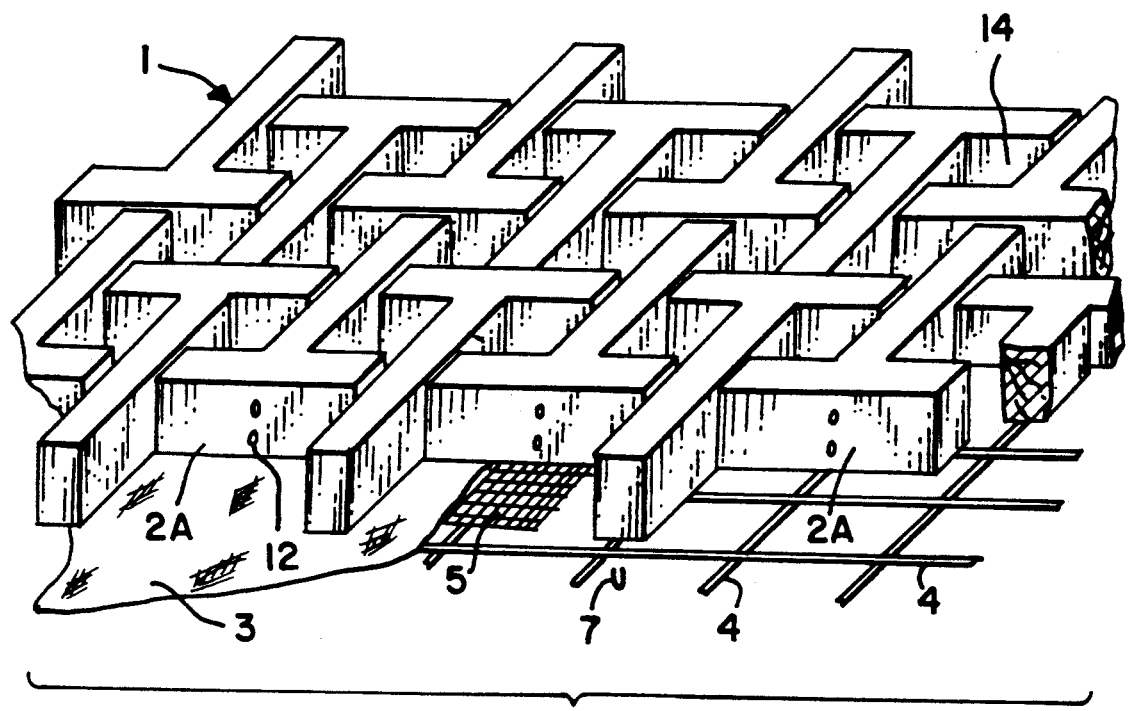
FIG. 1 is a perspective view of the wood element version of the present invention in the ground surfacing embodiment.
Figure 2:
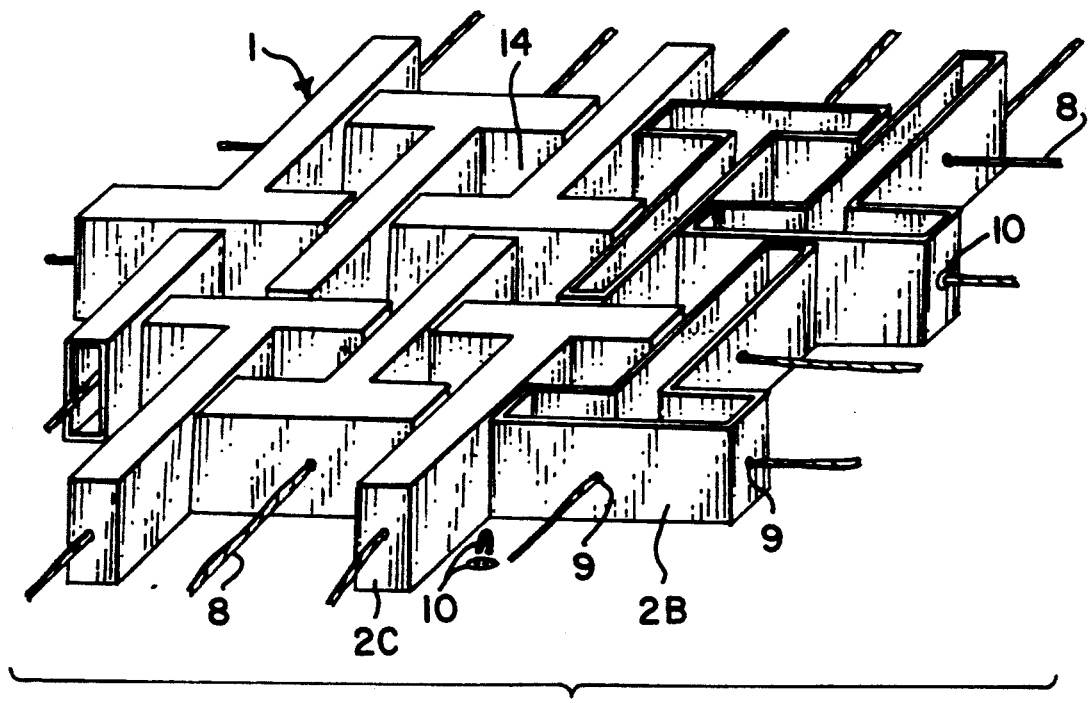
FIG. 2 is a perspective view of the present invention with metal, plastic, fiberglass or composite elements in the ground surfacing embodiment.
Figure 3:
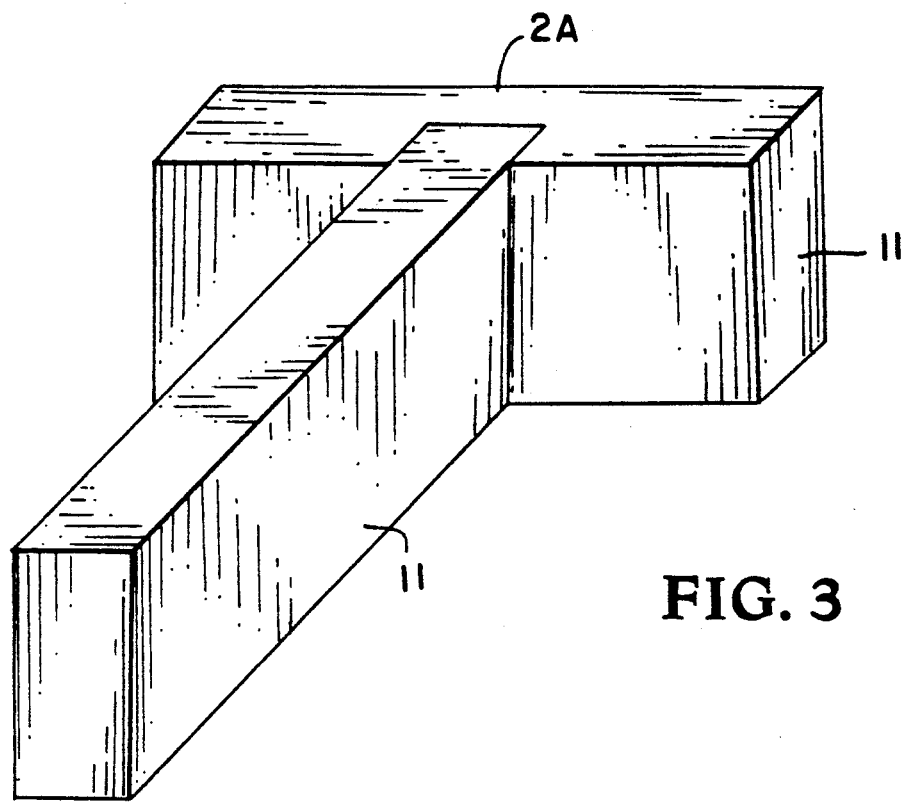
FIG. 3 is a view of a single wooden T-shaped element constructed by notching and gluing two pieces of precut stock lumber; 2×4's etc.
Figure 4:
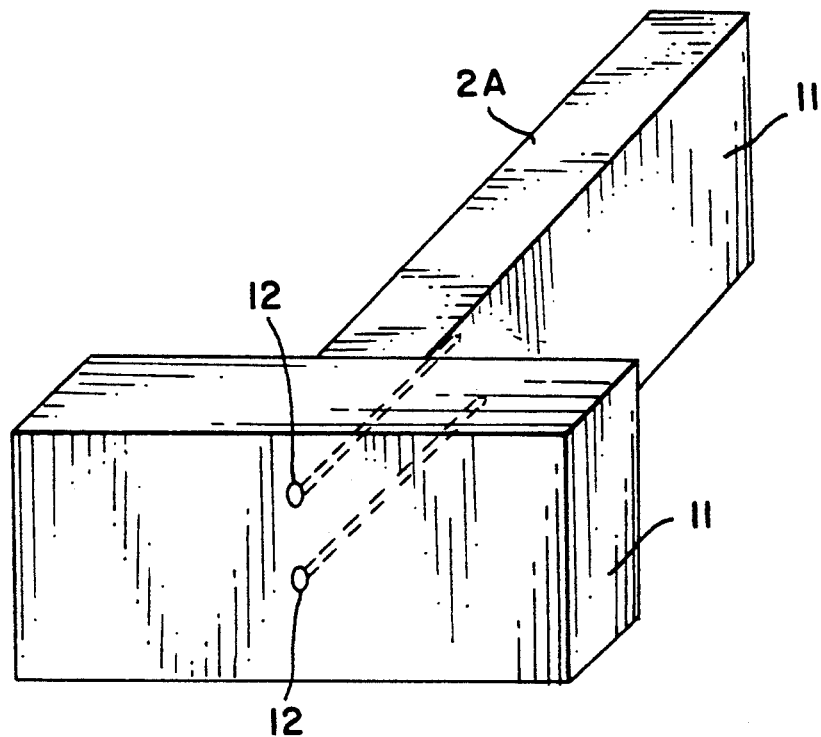
FIG. 4 is a view of a single wooden T-shaped element constructed by nailing two pieces of precut stock lumber; 2×4's-2×6's etc.
Figure 10:
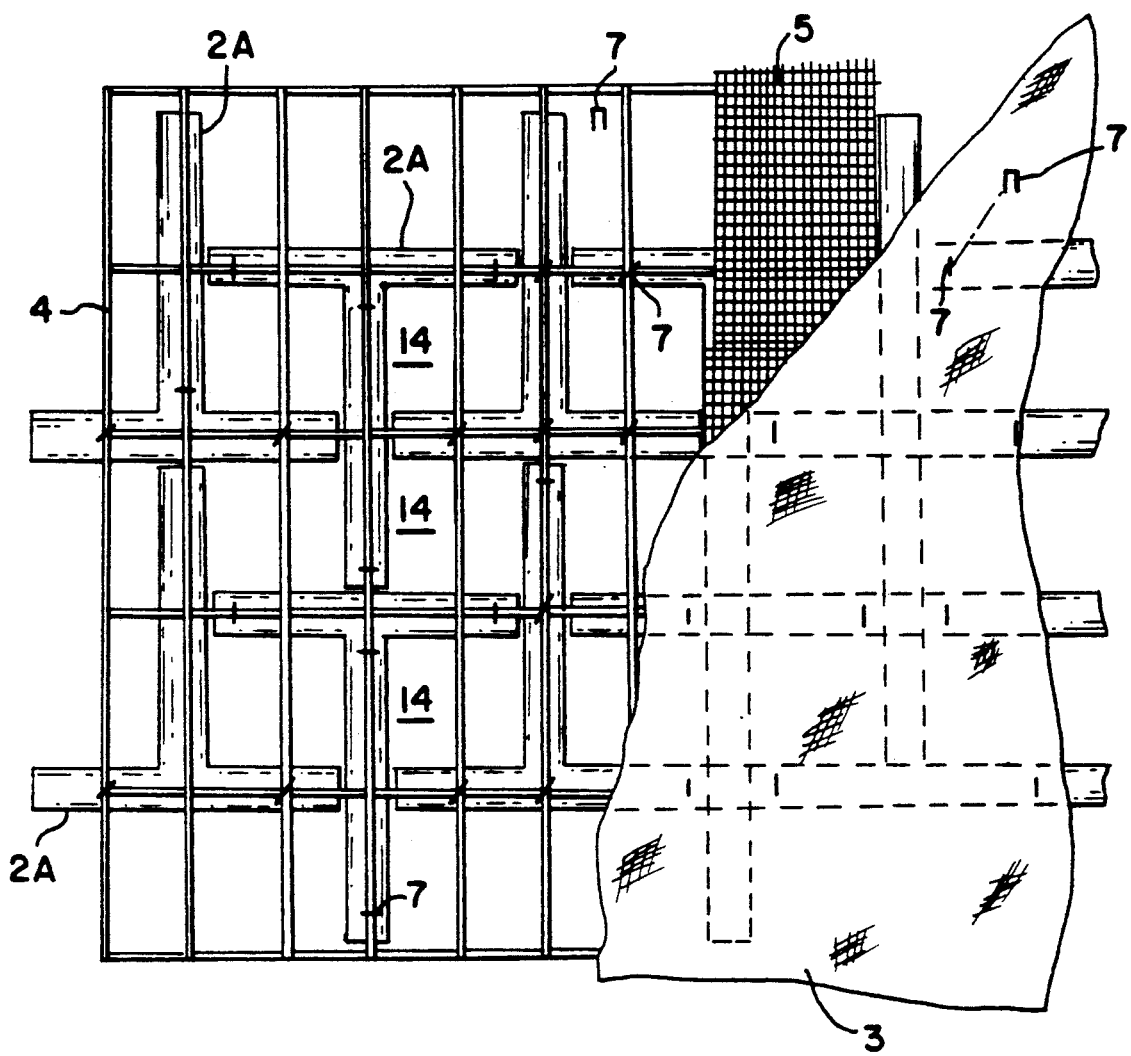
FIG. 10 is plan view of the present invention with the wooden T-shaped elements laid out in the reverse of the preferred embodiment (the manufacturing assembly layout, method) to show the three methods and materials of attachment.
Figure 11:
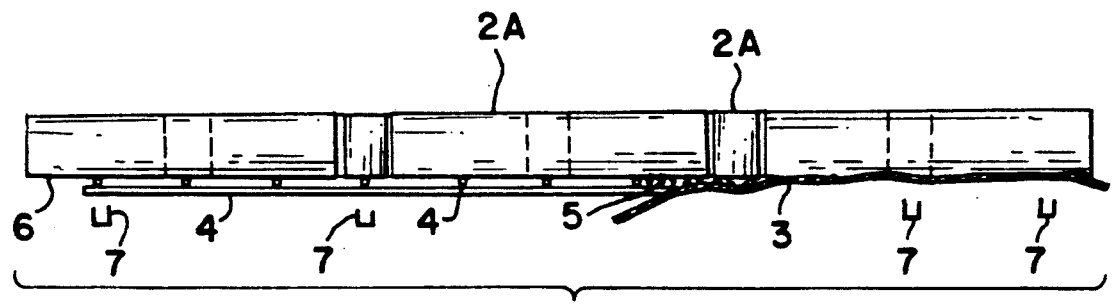
FIG. 11 is an elevation of the present invention with wooden T-shaped elements in the preferred embodiment for ground surfacing and erosion uses.

A ground surfacing and erosion control device 1 is shown in FIG. 1 and FIG. 2 comprising a surfacing mat or modules formed from a plurality of wooden T-shaped elements 2A or of metal, plastic, fiberglass, composite T-shaped elements 2B and 2C which are interconnected by various attaching materials. One method of attachment would use a nonwoven polypropylene fabric 3 that is attached to the bottom 6 of the wood T-shaped elements 2A by staples 7 as seen in FIG. 10 & FIG. 11. Other methods of attachment would use utility fencing of welded wire 4, and wire screen mesh 5 attached to the wood elements 2A by staples 7. FIG. 2 shows a method to attach the metal, plastic, fiberglass, composite T-shaped elements 2B and 2C by using cables, rods, wire or rope 8 passing thru predrilled holes 9. The ends of the attaching materials 8 would be secured by clamps, washers, and or welding 10 or knots on rope to retain the T-shaped elements 2B and 2C in the desired relative positions. FIGS. 3, 4, and FIG. 5 show how wooden T-shaped elements 2A can be constructed of precut pieces of lumber 11 using notching and gluing FIG. 3, using nails 12, FIG. 4 or the use of dowls 13 and glue FIG. 5, or any combination of joining the wood pieces 11 to form T-shaped elements 2A. The wood pieces 11 used for the T-shaped elements 2A, would normally be rot resistant by either the species used or made rot and decay resistant by chemical pressure treatment. The sizes of the T-shaped elements 2A, 2B, and 2C would depend on the embodiment desired. For example, for making roadbeds FIG. 12 the wood T-shaped elements 2A, could be from 6 to 12 inches in each dimension using stock 2×4 lumber. Larger sizes of wood T-shaped elements 2A would be used for embodiments such as sand dunes and embankments and for erosion control of saturated soils 20 i.e. 2×6" lumber 18" to 36" in each dimension.

Figure 6:
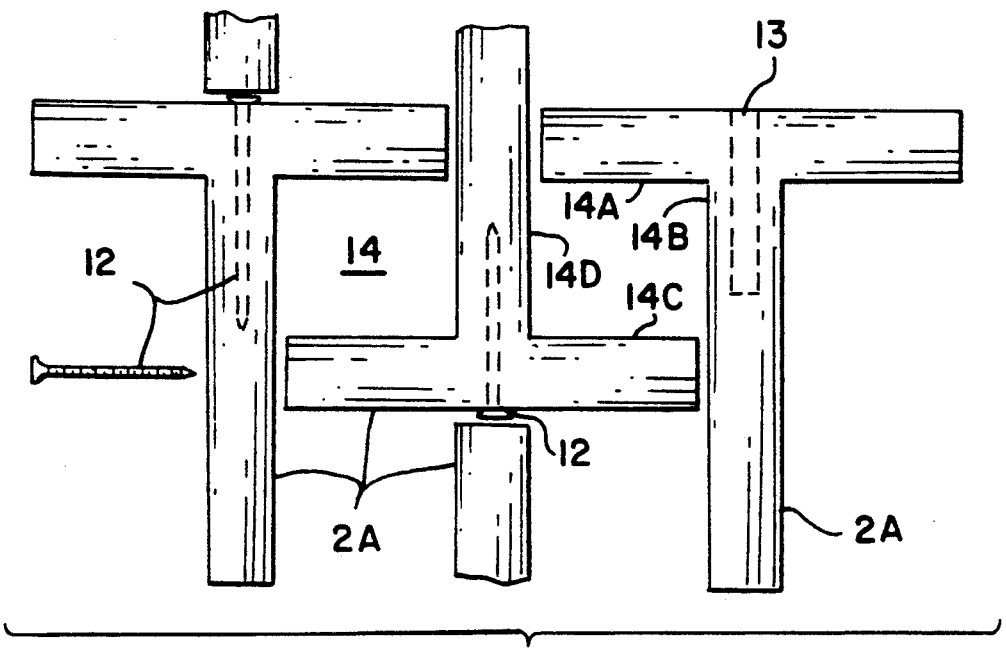
FIG. 6 is a plan view of the T-shaped elements lain out in grid form awaiting the application of attaching elements.

FIG. 6 demonstrates the desired position of each T-shaped element 2A to each other in the preferred embodiment. The T portion of one element 2A meets the I portion of the adjacent element 2A at approximately midpoint forming a coffer dam 14 having four vertical surfaces 14a, 14b, 14c, and 14d. Two coffer dams 14 are shown in FIG. 6.

Figure 7:
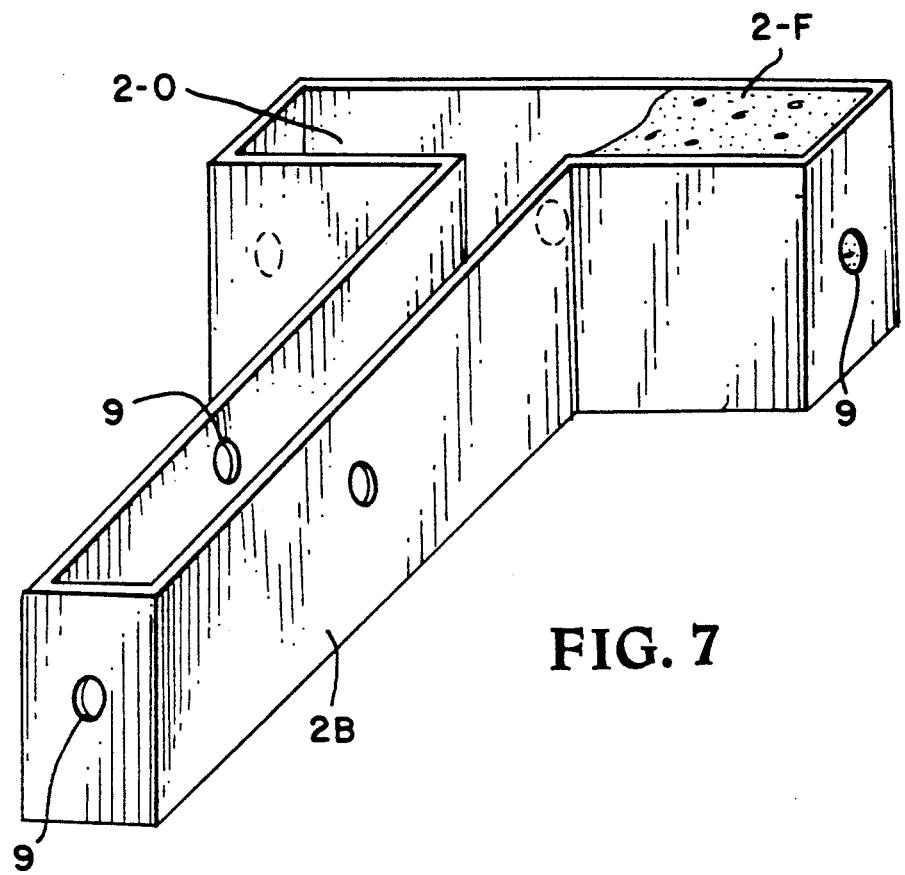
FIG. 7 is a perspective view of a T-shaped element that can be constructed of cast metal, or of formed plastic, fiberglass, and composites.

FIG. 7 and FIG. 8 are views of a T-shaped element 2B that can be cast of metal, formed or mouled of plastic, fiberglass or composites of the above and having holes 9 so located on the sides and the ends of the T-shaped 2B elements to allow passage and retention of the attaching interconnecting cables, rods, wire and or rope 8. The open face 2-o of the T-shaped element 2B would allow a filler material 2-f of foam plastic, solid plastic, concrete etc. to be added to the element 2B that would add regidity and strengthen the surfacing if so desired. The mats or modules of the present invention FIG. 2 would provide a stable load bearing surface that is still flexible enough for ground contours and sloping grades.

Figure 9:
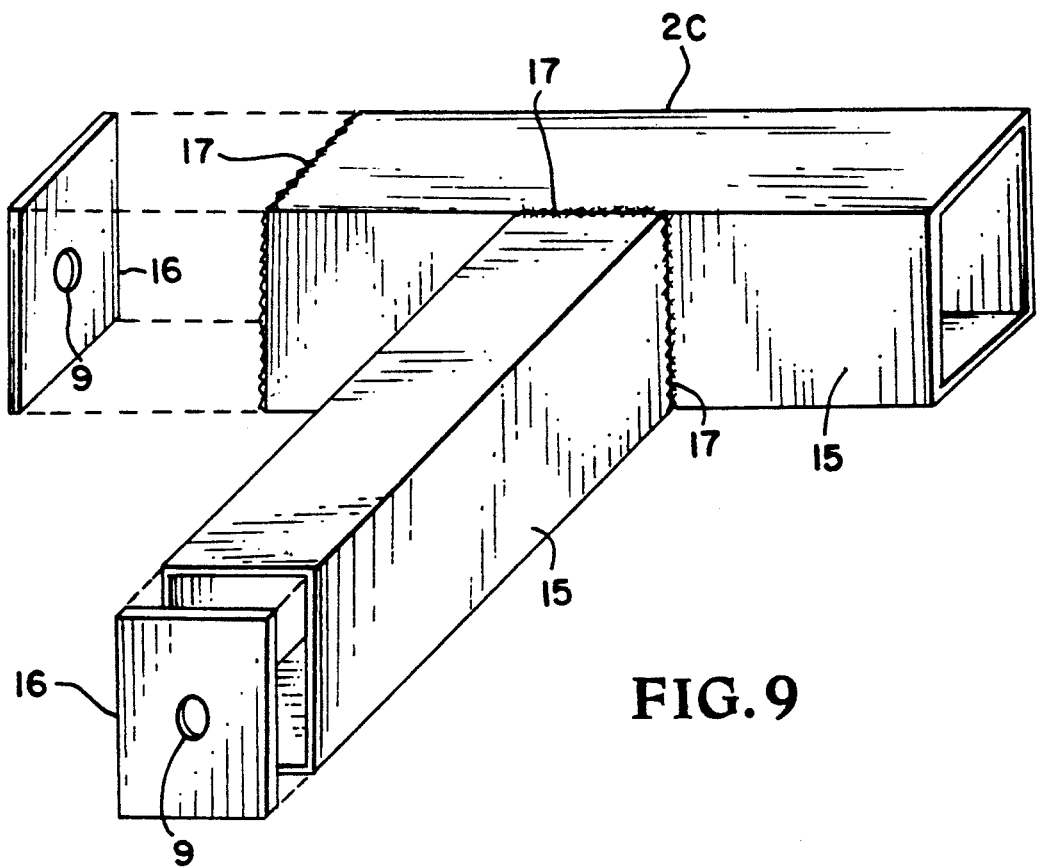
FIG. 9 is a perspective view of a T-shaped element constructed by welding two precut pieces of metal tubing of either square or rectangular extrusions and the welding of end pieces when applicable.

FIG. 9 is a view of a T-shaped element 2C constructed by welding 17 two precut metal extrusions 15; one extrusion 15 is welded 17 at the midpoint of the second extrusion 15. Holes 9 for the attaching and securing elements 8 would be drilled or cast prior to welding 17. End plates 16 with holes 9 would be welded 17 to the extruded ends of all the T-shaped elements 2C that make up the bordering or the four sides of a mat or module to allow securing of the attaching cables, rods, wire, rope etc. 8 by clamps, washers, welds and knots 10 respectively.

Figure 12:
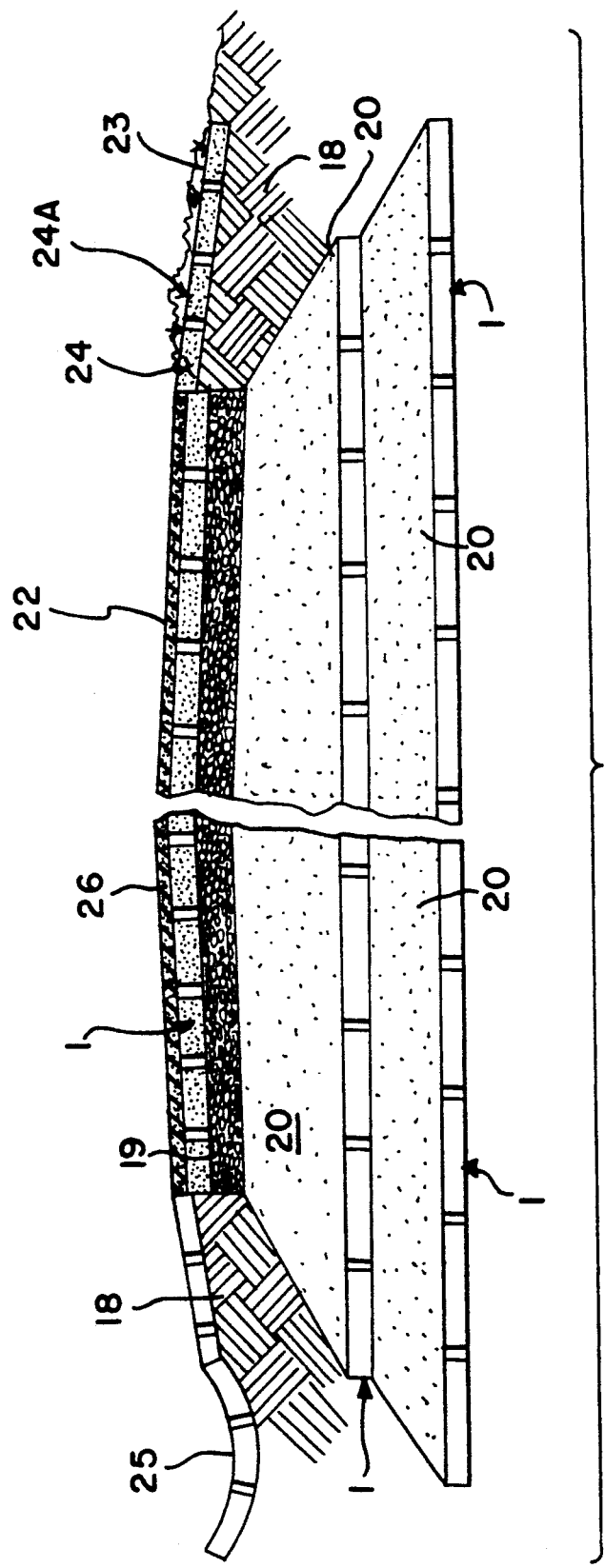
FIG. 12 is a cross sectional view of a roadway or highway showing the various embodiments and applications of the present invention from subbase erosion control uses to final pavement and shoulder applications.

The present invention 1 as shown in FIG. 12 can be used in various embodiments of roadway construction. In one embodiment the present invention 1 is used as an erosion control device to stabilize wet saturated soils 20 that must carry the loads of the roadbed to be constructed. In another embodiment the present invention 1 is laid directly on the ground surface 18 to form a roadway 22 or highway shoulder 23. Fill material 24 is placed in the coffer dams 14 of the invention such as soil, sand, or gravel. In addition to constructing and stabilizing dirt roads and highway shoulders 22, 23, this embodiment of the present invention would be used to construct golf cart paths, bike paths, nature trails, parking lots, sidewalks, campgrounds, etc. for commercial and public uses such as State and National Parks. Vegetation 24A can add to the stability and longivity of the surface by seeding the soil filled cofferdams with appropriate grass seeding or transplanted grass plugs or sprigs. Another embodiment of the present invention 1 would be to line ditches and drainage areas 25. Another embodiment would be the placement of the present invention 1 on a prepared subbase 19 for an asphalt roadway to use the invention 1 as an intergraded part of the asphalt roadbed. The hot asphalt or asphalt/rubber mix 26 would be applied in appropriate thickness, filling the cofferdam 14 voids forming a strong durable roadway 22. The sizes and choice of the T-shaped elements 2A, 2B, & 2C would vary according to functional uses. The wooden element 2A version of the present invention 1 would probably be more cost effective for the above embodiments of standard roadway construction and public uses such as National and State Parks.

Figure 13:
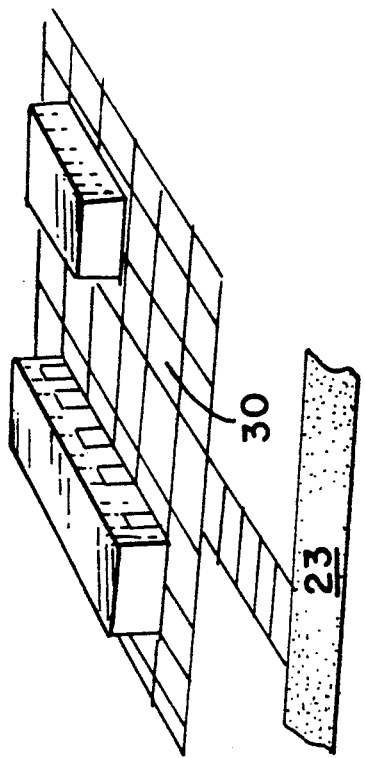
FIG. 13 shows an application of the present invention for military uses; to construct runways and taxiways, and repair bomb damaged areas.
Figure 14:
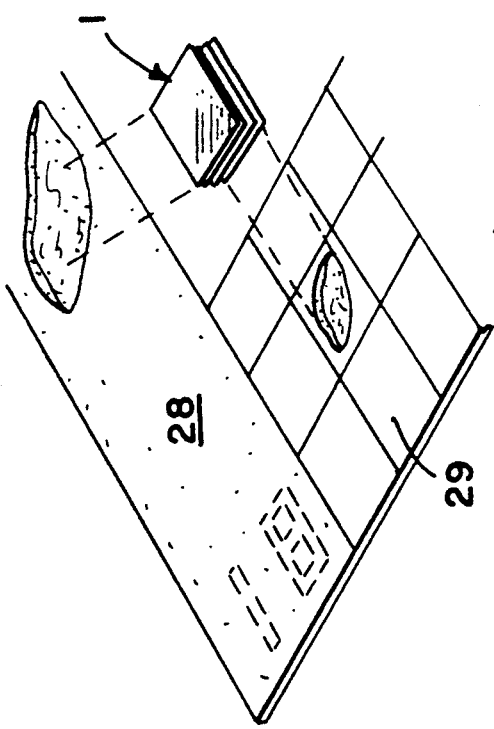
FIG. 14 shows an application of the present invention for military or civil uses to construct parking areas, ramps, roads, sidewalks, etc. temporary or permanent.
Figure 15:
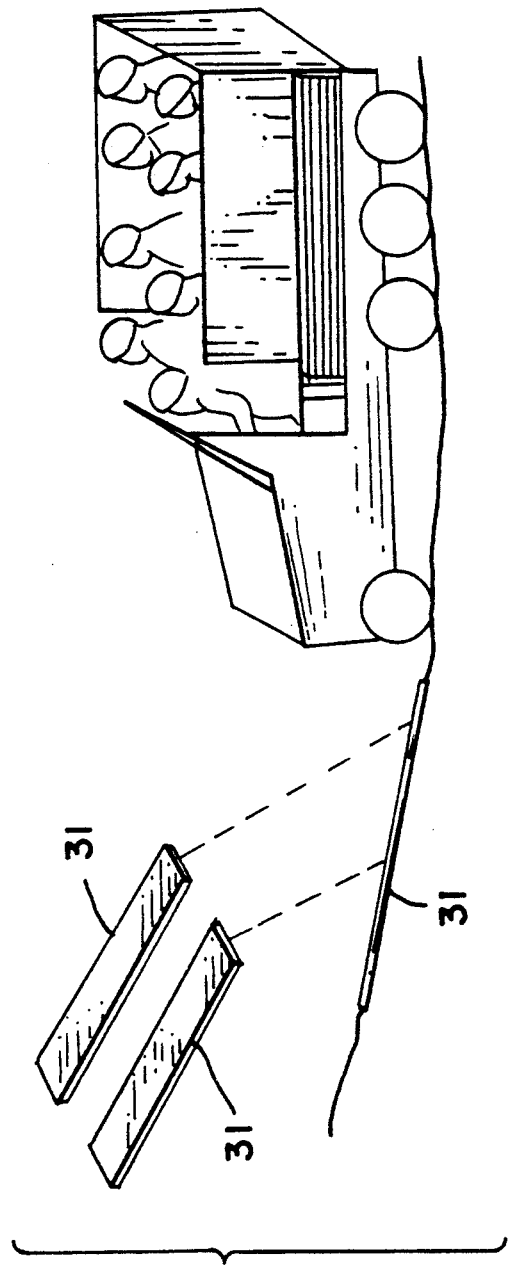
FIG. 15 shows an application of the present invention specifically designed for off road vehicle emergency uses both military and non-military.

Referring to FIGS. 13, 14 & 15 the present invention in this embodiment is shown as transportable sizes of ground surfacing mats 1 being used for military uses and emergency disaster applications. This embodiment with plastic, fiberglass, composite, or metal T-shaped elements 2B, 2C, would be used to build temporary and damaged runways 28, and taxiways 29, to build, storage and parking areas 30 to build temporary or permanent roadways 23, etc. A specialized light weight high strength version of the present invention 31 can be made to be carried on and applied for emergency uses with vehicles FIG. 15. In all of the above embodiments the T-shaped elements 2B, 2C would be manufactured for specific uses and load bearing capacity of and of appropriate materials such as high strength light weight metals, plastics or composites for easy transportation and storage. Some models of the present invention 1 designed for runway 28, 29 uses may differ in the size of the elements and differ in materials from other models of the invention 1. For example the storage 30 or roadway 22 uses may be of different sizes and materials than the runway 28 uses but the design principles are the same. The invention 1 has been described above in conjunction with specific embodiments for ground surfacing uses that enhances traffic for both vehicular and pedestrian uses.

Figure 17:
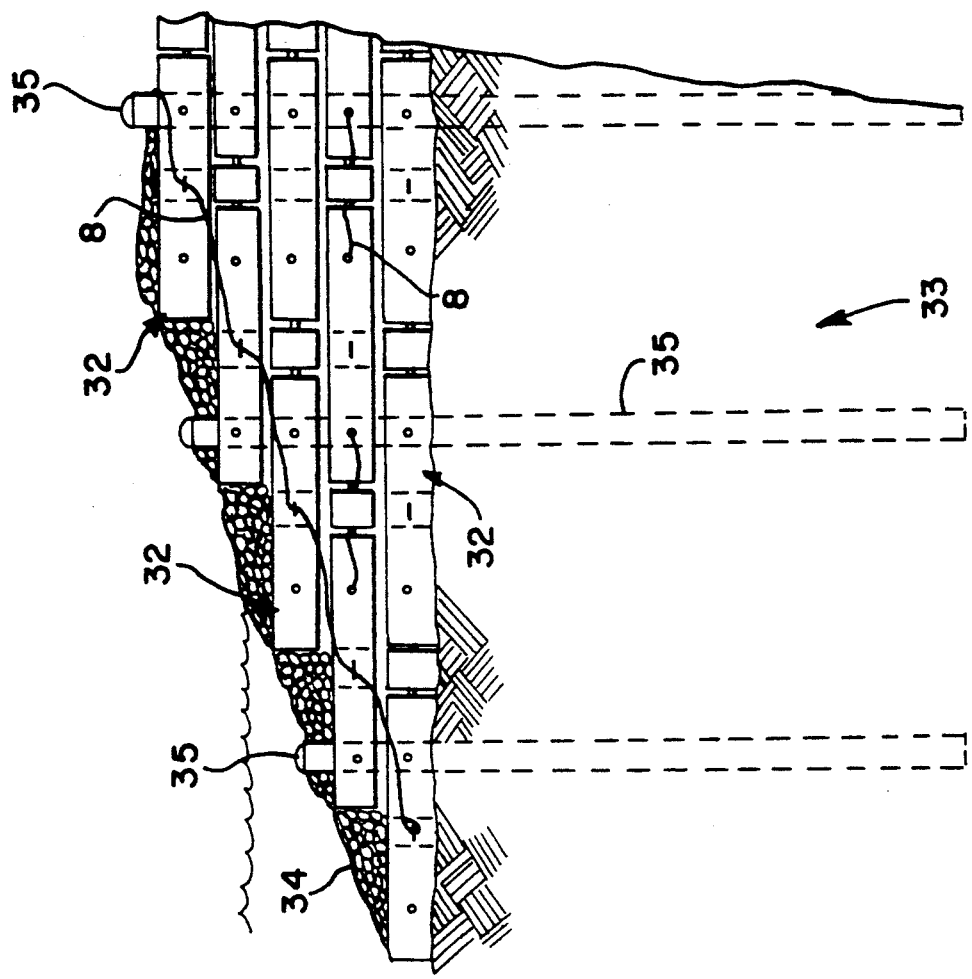
FIG. 17 is a cross section view of a sea wall or a jetty designed to withstand forces of tides, wind, and storms that is constructed with modules of the present invention using reinforced concrete T-shaped elements and concrete pilings.
Figure 16:
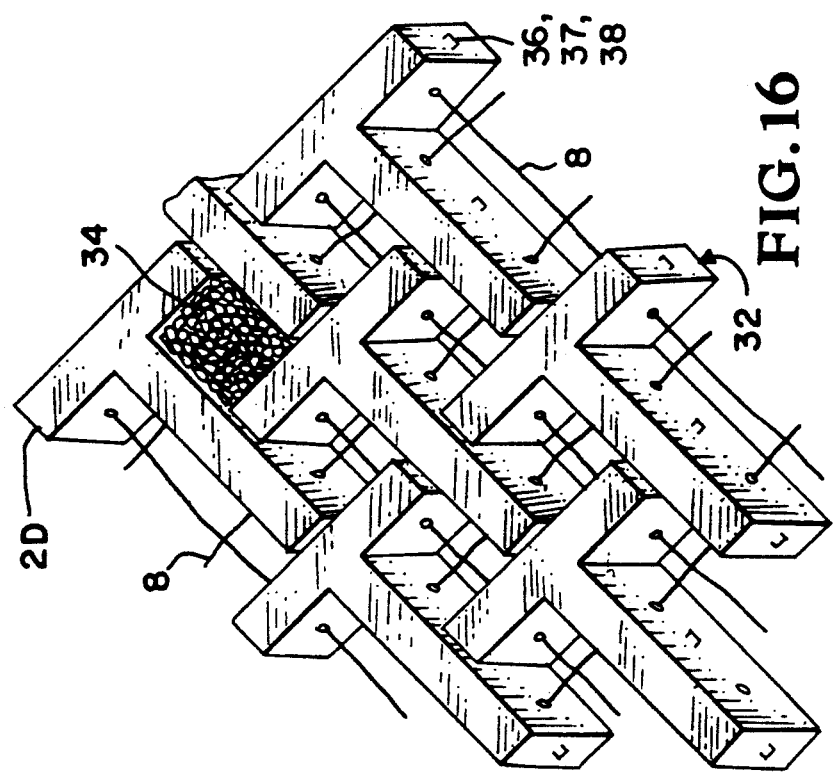
FIG. 16 is a perspective view of the present invention wherein the T-shaped elements are constructed of reinforced concrete.
Figure 20:
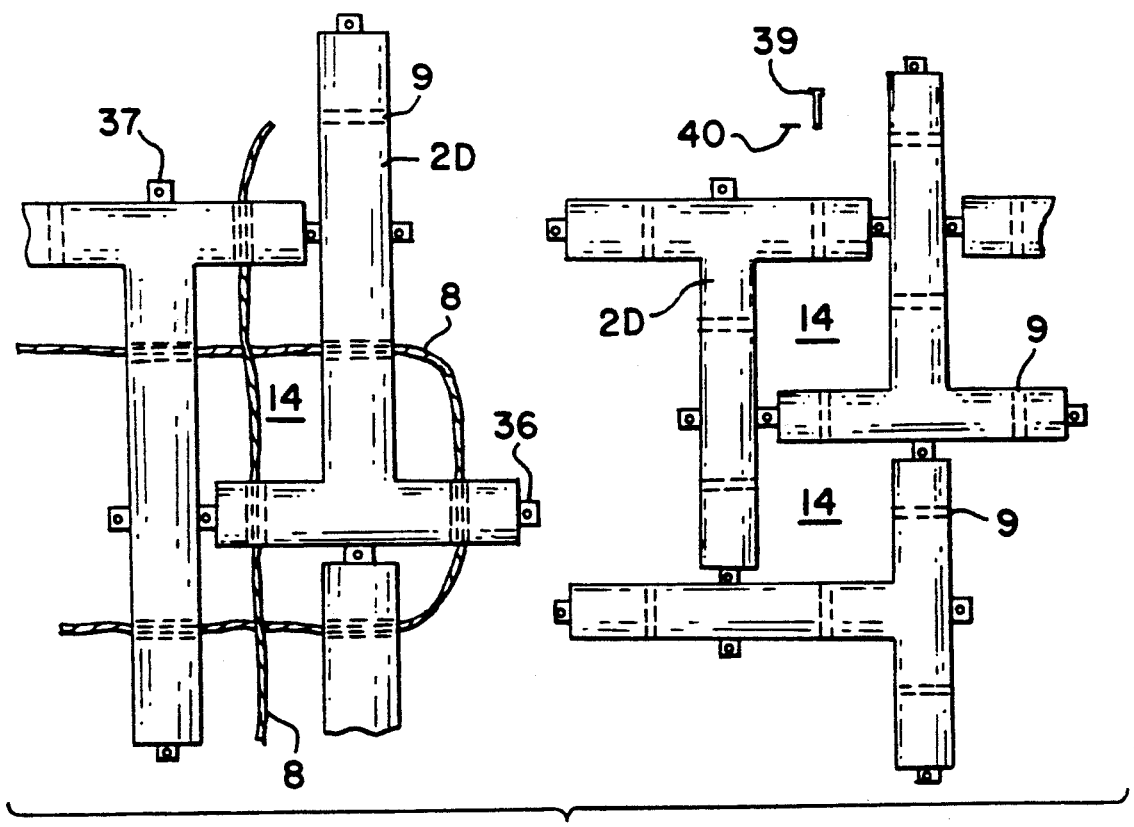
FIG. 20 are two plan views of the present invention showing placement of the concrete T-shaped elements in relation to each other.

FIG. 16 depicts another embodiment of the present invention that use T-shaped reinforced concrete elements 2D and attaching and connecting cables 8, to construct a device 32 or devices 32 for the primary purpose of preventing beach erosion and provide protection from hurricanes, high tides, and wind storms. This embodiment of the present invention 1 as a device 32 or plurality of devices 32 would be applied in the construction of new sea walls, jetties, breakwaters, fishing reefs, repairs of the foregoing and the other marine applications requiring erosion control features. FIG. 17 show a cross-section of the devices 32 applied to construct a sea wall, breakwater, dam or jetty 33. Concrete T-shaped elements 2D are arranged to form a foundation or base device 32 and additional elements 2D are stacked on in layers forming additional devices 32 to achieve the desired structure 33. Attaching cables 8 are either strung through precast holes 9 and/ or attached to unused connecting elements 36, 37, & 38. Shown are the use of pilings 35 and the application of rock 34 to fill the cofferdams 14. FIG. 18 is a view of the T-shaped reinforced concrete element 2D and FIG. 19 are views of the connecting and lifting elements of cast in pre drilled metal plates 37 welded to the reinforcing bars 36 of the concrete elements 2D and metal eyelets 38 welded to the reinforcing bars within the T-shaped elements 2D. Also the reinforcing bars of the T-shaped elements 2D of corrison resistant metals can be looped and also become connecting elements 36 by extending the loops beyond the concrete form during manufacture. FIG. 20 shows two layout patterns of how the T-shaped elements 2D can be arranged and also shows rectangular and square cofferdams 14 with cubical areas or voids that are filled with rock 34 or rip-rap. Also shown are cable 8 attachment features if the need is warranted. Also shown is where one T-shaped element 2D is attached to an adjacent T-shaped element 2D. The attaching elements 36, 37, or 38 of an end section are aligned to the midsection attaching elements 36, 37, or 38 to allow insertion of a pin 39 and key or bolt lock 40. Note that the weight of the concrete T-shaped elements, the design feature of the T arm meeting the I arm at midpoint which forms a grid pattern of elements and cofferdams that are not able to shift position when a plurality of T-shaped elements 2D are employed. This feature alone provides for a highly stable method for erosion control even without the connecting/attaching elements 36, 37, 38, 39, 40, or connecting cables 8 or chains attached that makes up an erosion control devices 32, 33.

Figure 21:
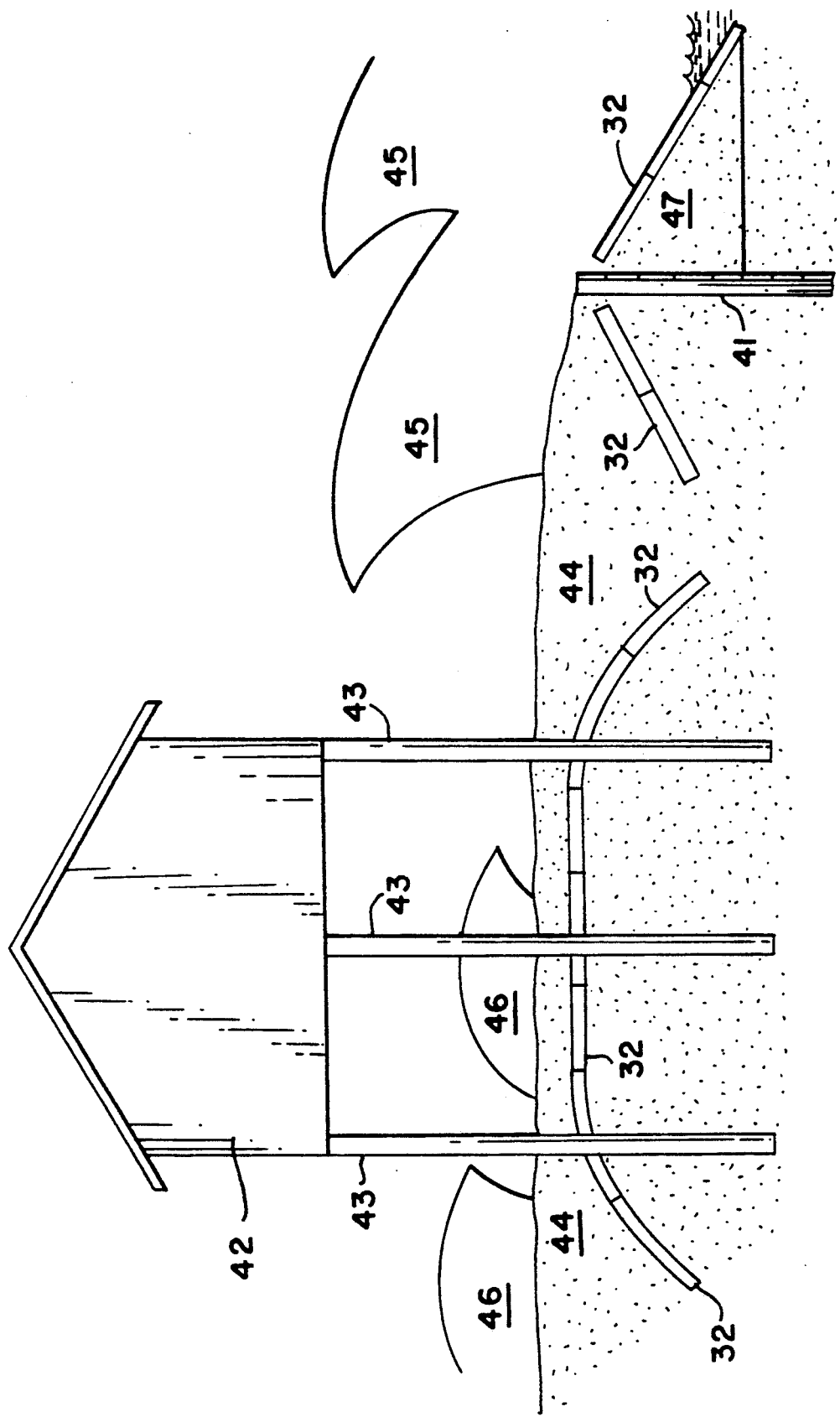
FIG. 21 is a cross section view of sea shore structures and the application of the present invention in the embodiments of erosion control to offset the effects of high tides, wind, storms, hurricanes and washback scouring.

FIG. 21 depicts the uses of the present invention 1 using mat like devices 32 on an ocean front beach area 44. Normally beach front structures, buildings 42, fishing piers, etc. are built on pilings 43 to allow passage of water from tidal surges and large waves 45 resulting from storms and hurricanes. Some oceanfront beach areas 44 have standard vertically constructed sea walls 41 in front of the buildings to prevent erosion and loss of beach areas 44 caused by the washback or scouring of returning wave action 46. Studies of recent hurricanes (Hurricane Hugo 1989) have indicated that engineered structures 42 when built on pilings 43 have and can withstand the forces encountered. However there has been substantial loss of beach areas 44 from scouring returning wave action 46 with the inadequacies of sea walls 41 as presently constructed. The present invention I used as erosion control devices 32 are layed on a sand embankment (renourished area) 47 in front of the sea wall 41 and buried at an angle behind the seawall 41. Also the areas 44 under the buildings 42 between the pilings 43 have devices 32 buried at angles and on or near the surface to prevent scouring. These devices 32 additionally can provide a base foundation for a concrete or asphalt parking space under the building 42.

Figure 22:
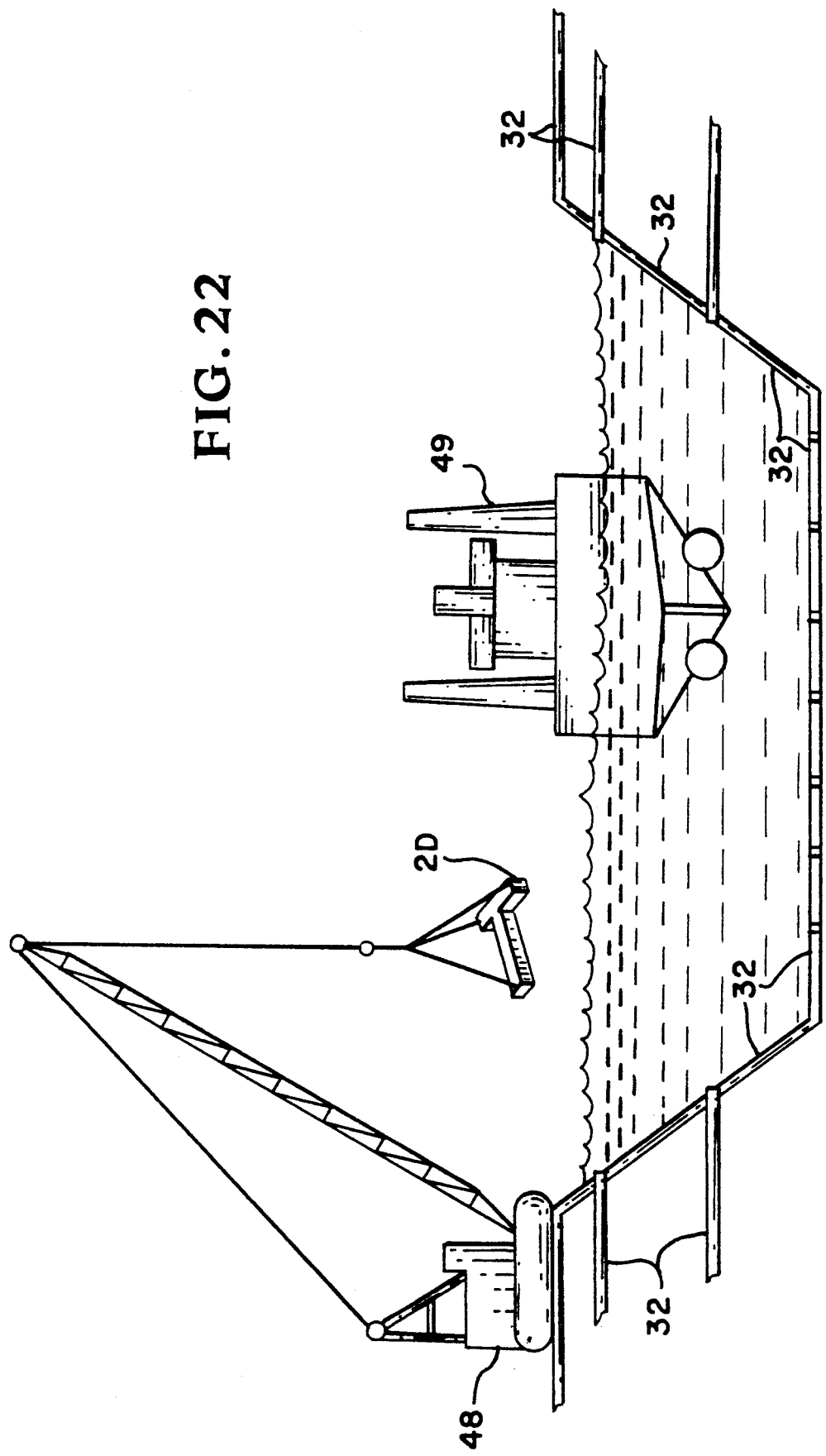
FIG. 22 is a cross sectional view of a canal or waterway subject to severe erosion and the application of the present invention (concrete T-shaped elements) to control bank erosion and maintain waterway commerce.

FIG. 22 depicts the use of the present invention 1 in constructing and installing erosion control devices 32 to line ship canals and channels where the embankment areas are subject to heavy erosion because of poorly stabilized embankment soils (sand, mud, etc.) or the erosion caused by wake and waves from sea going traffic. Large concrete T-shaped elements 2D or mat like devices 32 are lowered into position by land based cranes 48 or placed by cranes and equipment on vessels 49 designed for such work. Appropriate attaching devices 36, 37, 38, 39, & 40 are installed, cabling 8 and clamping devices 10 added if required and rock 34 riprap is used to fill the cofferdams 14.

FIG. 23 depicts a cross-section of an ocean front beach area 44 that has been subject to heavy beach erosion. A structure 42 (light house with foundation) that was constructed many years ago is subject to destruction from continuing erosion. The original beach elevation is depicted by the dotted line 50 and the hashed area 51 depicts the volume of sand or soil lost to erosion by heavy wave 45 action over the years. The solid line 52 depicts the present beach elevation and the area and volume 47A that will continue to erode and eventually will topple or destroy the structure 42 (lighthouse).

FIG. 24 depicts the erosion control steps and the application of the present invention 1; first to stop erosion and then to rebuild, refurbish the beach area 44 to its' former status 50 and to prevent further erosion. The first step would be the application of the present invention 1 by laying devices 32 on the present shoreline 51 area in front of the structure 42 and extending the devices 32 below the mean water level to the natural bottom. The next step would be to reduce wave action 45 by placing a breakwater 33 off shore composed of stacked devices 32 of the present invention 1. The T-shaped concrete elements 2D would be sized and engineered to withstand the forces expected. This would reduce the forces and size of waves 45A acting on the shoreline. The beach areas 44 would then be refurbished by hauling in fill 47 or by natural renourishment 47 from wave and tidal action. After a renewal of some magnitude another layering of the present invention 1 with devices 32 would take place followed by more refurbishing 47 or renourishment 47 and another layering and application of the present invention 1 and device 32 application until the desired beach front elevation 50 is achieved. The final action for beach restoration would be the planting of native grasses, sea oats etc. on the top layer of devices 32 that have sand filled cofferdams 14.

Where new beach areas are desired (for example extending a barrier island) the above principles using appropriate versions of the present invention would apply.

I claim:

1. A universally flexible fabricated ground stabilizing surface device for the compaction of soils so that load bearing traffic and load bearing uses can be effected and for erosion control or the like comprising:
   a. plurality of uniform T-shaped building elements secured together forming a continous barrier and surface, said elements being of substantially the same size and configuration, the T-shaped elements arranged in a pattern wherein, except for the periphery of the fabricated device each element has a pair of adjacent elements wherein the T-shaped horizontal portion of an element extends perpendicular to the I or longitudinal portion of the adjacent T-shaped element at the longitudinal midpoint, and means flexibility retaining the building elements in their relative position forming coffer dams for soil retention and compaction.

2. A fabricated device as in claim 1, wherein the T-shaped elements are fabricated of uniform pieces of cut lumber.

3. A device as in claim 2, wherein the elements are treated with a preservative if the lumber is subject to rot.

4. A device as in claim 2, wherein the retaining means is a fabric material stapled to elements of lumber.

5. A device as in claim 2, wherein the retaining means is wire mesh or fencing.

6. A fabricated device as in claim 1, wherein the T-shaped elements are fabricated of plastics, fiberglass, or compsites of both.

7. A fabricated device as in claim 1, wherein the T shaped elements are fabricated of metal cast, extruded, or of two tubing sections welded at mid point of one section.

8. A fabricated device as in claim 1, where in the T-shaped elements are fabricated of reinforced concrete.

9. A device as in claim 6, wherein the retaining means are cables, wire or rope.

10. A device as in claim 7, wherein the retaining means are cables, wire or rods.

11. A device as in claim 8, wherein the T-shaped elements have connecting eyelets and holes to allow lifting and retention by cables or chains.

12. A device as in claim 8, wherein attachment devices are built into the T-shaped elements and are connected by pins, bolts etc.

13. A fabricated device as in claim 6, wherein the T-shaped elements of plastics or fiberglass become forms for the fabrication of T-shaped elements of concrete.

14. A fabricated device as in claim 1, wherein the T-shaped elements can be of various sizes, lengths, widths, depths, depending on the uses of the device.

15. A fabricated device as in claim 1, wherein the coffer dams formed by the placement of T-shaped elements can be filled with loose materials sand, soil, gravel, rock, etc. to afford compaction and additional stabilization.

16. A fabricated device as in claim 1, wherein the cofferdams formed by the T-shaped elements can be filled with highway bituminous asphalt and or asphalt rubber mixes that are techniques for using ground up wornout tires with liquid asphalt or other binders in place of gravel and sand in highway construction.

* * * * *